US008880672B2

(12) United States Patent
Kuzmin et al.

(10) Patent No.: US 8,880,672 B2
(45) Date of Patent: Nov. 4, 2014

(54) MODIFYING REDISTRIBUTION SETS OF USERS BASED ON EXPIRATION TIME

(75) Inventors: Dmytro Kuzmin, Mountain View, CA (US); Zhengzhu Feng, Sunnyvale, CA (US); Alok Aggarwal, Foster City, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 13/389,645

(22) PCT Filed: Nov. 1, 2011

(86) PCT No.: PCT/UA2011/000107
§ 371 (c)(1),
(2), (4) Date: Feb. 9, 2012

(87) PCT Pub. No.: WO2013/066281
PCT Pub. Date: May 10, 2013

(65) Prior Publication Data
US 2013/0191521 A1 Jul. 25, 2013

(51) Int. Cl.
*G06F 15/173* (2006.01)
*G06Q 30/02* (2012.01)
*H04L 29/08* (2006.01)

(52) U.S. Cl.
CPC ............ *H04L 67/10* (2013.01); *G06Q 30/0272* (2013.01); *G06Q 30/0251* (2013.01)
USPC ........................................................ 709/223

(58) Field of Classification Search
USPC .......... 709/201–207, 212–226, 238–246, 200
See application file for complete search history.

(56) References Cited

U.S. PATENT DOCUMENTS

| | | | |
|---|---|---|---|
| 2002/0082923 A1* | 6/2002 | Merriman et al. | 705/14 |
| 2007/0168443 A1* | 7/2007 | Morgan | 709/207 |
| 2007/0198346 A1* | 8/2007 | Beyda et al. | 705/14 |
| 2008/0249853 A1* | 10/2008 | Dekel et al. | 705/14 |
| 2008/0294523 A1* | 11/2008 | Little | 705/14 |
| 2009/0132346 A1* | 5/2009 | Duggal et al. | 705/10 |
| 2009/0175276 A1* | 7/2009 | Tsuge et al. | 370/392 |
| 2009/0234708 A1* | 9/2009 | Heiser et al. | 705/10 |
| 2009/0327125 A1* | 12/2009 | Jain | 705/40 |
| 2010/0017287 A1* | 1/2010 | Caldwell et al. | 705/14.43 |

(Continued)

OTHER PUBLICATIONS

Green (Green, Lorenzo, Retargeting the Ultimate Guide to Winning, Jul. 5, 2011, Mr Green, retrieved from http://www.mrgreen.am/affiliate-marketing/retargeting-the-ultimate-guide-to-winning/, pp. 1-16).*

(Continued)

*Primary Examiner* — Brian J Gillis
*Assistant Examiner* — Michael A Keller
(74) *Attorney, Agent, or Firm* — Fish & Richardson P.C.

(57) ABSTRACT

Methods, computer-readable media, and systems for modifying redistribution sets of users based on expiration time. A redistribution set including multiple present users to whom selected content is presentable for a pre-defined duration is received. Multiple past users who were included in the redistribution set have previously been removed from the redistribution set based on an expiration of the pre-defined duration. In response to detecting a modification to the pre-defined duration, the redistribution set of users is modified to include one or more past users or to exclude one or more present users. The redistribution set thus modified is used to target content to users in the modified redistribution set.

22 Claims, 5 Drawing Sheets

(56) References Cited

U.S. PATENT DOCUMENTS

| | | | |
|---|---|---|---|
| 2010/0250365 A1* | 9/2010 | Hariharan et al. | 705/14.53 |
| 2011/0179359 A1* | 7/2011 | Nussel et al. | 715/738 |
| 2011/0248818 A1* | 10/2011 | Hashim-Waris | 340/5.52 |
| 2012/0084142 A1* | 4/2012 | Li et al. | 705/14.46 |
| 2012/0271714 A1* | 10/2012 | Farahat et al. | 705/14.53 |
| 2012/0323694 A1* | 12/2012 | Lita et al. | 705/14.66 |
| 2013/0064336 A1* | 3/2013 | Schadt et al. | 375/354 |

OTHER PUBLICATIONS

Helft (Helft, Miguel, Retargeting Ads Follow Surfers to Other Sites, Aug. 29, 2010, NY Times, retrieved from http://www.nytimes.com/2010/08/30/technology/30adstalk.html?_r=4, pp. 1-5).*

Raehsler (Raehsler, Lisa, Retargeting: Beyond the Basics, May 6, 2011, Clickz, retrieved from http://www.clickz.com/clickz/column/2049640/retargeting-basics, pp. 3-12).*

Geddes (Geddes, Brad, Everybody Deserves a Second Chance: Using Remarketing to Reach Abandoned Shoppers, May 24, 2010, Searchengineland, retrieved from http://searchengineland.com/everybody-deserves-a-second-chance-using-remarketing-to-reach-abandoned-shoppers-2-42609, pp. 1-6).*

Interactive Advertising Bureau (Interactive Advertising Bureau, Interactive Audience Measurement and Advertising Campaign Reporting and Audit Guidelines, Sep. 2004, Version 6.0b, retrieved from http://www.iab.net/media/file/US_meas_guidelines.pdf, pp. 1-20).*

Hamman (Hamman, Dax, 5 Simple Steps to Stop Wasting Budget With Poor Retargeting, Sep. 14, 2011, Searchengineland, retrieved from http://searchengineland.com/5-simple-steps-to-stop-wasting-budget-with-poor-retargeting, pp. 1-4).*

Marsten (Marsten, Elizabeth, Google AdWords ReMarketing Everything You Need to Know, Mar. 25 2010, Portent.com, retrieved from http://www.portent.com/blog/ppc/google-adwords-remarketing.htm, pp. 1-14).*

Gabe (Gabe, Glenn, How to Set Up Remarketing in Google AdWords [Tutorial]—Behavioral Targeting on the Display Network, May 4th 2010, retrieved from http://www.hmtweb.com/imd/?p=93, pp. 1-20).*

International Search Report and Written Opinion; Jul. 11, 2012; World Intellectual Property Organization (WIPO) (International Bureau of); PCT/UA2011/000107; 11 pages.

* cited by examiner

MODIFYING REDISTRIBUTION SETS OF USERS BASED ON EXPIRATION TIME

CROSS-REFERENCE TO RELATED APPLICATION

This application claims priority to Application Serial No. PCT/UA2011/000107, filed on Nov. 1, 2001, entitled MODIFYING REDISTRIBUTION SETS OF USERS BASED ON EXPIRATION TIME, the disclosure of which is incorporated herein by reference.

TECHNICAL FIELD

This specification relates to distributing content.

BACKGROUND

The Internet provides access to a wide variety of resources. For example, video and/or audio files, as well as web pages for particular subjects or particular news articles are accessible over the Internet. Access to these resources presents opportunities for advertisements to be provided with these resources and search results pages that facilitate identification of these resources. For example, a web page (such as, a search results page) can include advertisement slots in which advertisements can be presented. These advertisements slots can be defined in the web page or defined for presentation with the web page, for example, in a pop-up window.

Some systems allow for grouping users into sets based on characteristics shared by users in the group (for example, content of web pages viewed by the users). Such sets can be exposed to content sponsors who can present content to all users in the group. For example, if a user in a set selects to view content provided by the content sponsor, then the content sponsor can redistribute similar content to the user and the set to which the user belongs.

SUMMARY

In general, one innovative aspect of the subject matter described here can be implemented as a computer-implemented method. A redistribution set including multiple present users to whom selected content is presentable for a pre-defined duration is received. Multiple past users who were included in the redistribution set have previously been removed from the redistribution set based on an expiration of the pre-defined duration. A modification to the pre-defined duration is detected. In response to detecting the modification, the redistribution set is modified to include one or more past users or to exclude one or more present users resulting in a modified redistribution set of users. The modified redistribution set of users is used to target content to the multiple present users in the modified redistribution set.

This, and other aspects, can include one or more of the following features. Each user of the multiple present users and the multiple past users can be associated with a corresponding inclusion time when a respective user was included in the redistribution set. The modification to the pre-defined duration can result in a modified duration. Modifying the redistribution set of users can occur at a present time. For each user of the multiple present users and the multiple past users, a sum of an inclusion time and the modified duration can be determined. Modifying the redistribution set of users to include the one or more past users can include, for each of the multiple past users, identifying a user for whom the sum is greater than the present time as one of the one or more past users to be included in the redistribution set. Modifying the redistribution set of users to exclude the one or more present users can include, for each of the multiple present users, identifying a user for whom the sum is less than the present time as one of the one or more present users to be excluded from the redistribution set. The present time can be a time of detecting the modification to the pre-defined duration. The present time can be a previously defined time to determine whether the pre-defined duration has been modified. The modification can be an extension to the pre-defined duration resulting in an extended duration. Modifying the redistribution set of users can include determining that the one or more past users are includable in the redistribution set based on the extended duration. The modification can be a shortening of the pre-defined duration resulting in a shortened duration. Modifying the redistribution set of users can include determining that the one or more present users are excludable in the redistribution set based on the shortened duration. Detecting a modification to the pre-defined duration can include receiving an instruction to modify the pre-defined duration from a provider of the selected content. The selected content can include one or more advertisements. The multiple present users can be stored in a first list. The multiple present users and the multiple past users can be stored in a second list. Modifying the redistribution set of users to include one or more past users can include identifying the one or more past users from the second list, and including the identified one or more users in the first list as new present users. Modifying the redistribution set of users to exclude one or more present users can include removing the excluded one or more present users from the first list, and including the excluded one or more present users in the second list as new past users. The modification to the pre-defined duration can be periodically detected.

Another innovative aspect of the subject matter described here can be implemented as a computer-implemented method. A redistribution set including multiple users to whom selected content is presentable for a pre-defined duration is received. Upon an expiration of the pre-defined duration, a subset of the multiple users is excluded from the redistribution set. A new duration for which the selected content is presentable to users in the redistribution set is received. The new duration is greater than the pre-defined duration. One or more users from users in the subset to whom the selected content is presentable based on a difference between the new duration and the pre-defined duration are identified. The identified one or more users in the redistribution set results are included in a modified redistribution set. The modified redistribution set is used to target content to the multiple users in the modified redistribution set.

This, and other aspects, can include one or more of the following features. The selected content can be an advertisement. Pre-defined duration and the new duration can be specified by a provider of the selected content. Each user of the multiple users is associated with a corresponding inclusion time at which a respective user was included in the redistribution set. Excluding the subset of the multiple users from the redistribution set can include, for each user in the subset, determining that a sum of an inclusion time and the pre-defined duration is greater than a present time. The inclusion time can be a time when a respective user was added to the redistribution set. Including the identified one or more users in the redistribution set can include, for each of the one or more users who are included, determining that a sum of an inclusion time and the new duration is less than a present time. The inclusion time can be a time when a respective user was added to the redistribution set. The present can be a previously defined time to determine whether the pre-defined duration has been modified.

Additional innovative aspects of the subject matter described here can be implemented as computer-readable media storing computer program instructions executable by data processing apparatus to perform the operations described here. Further innovative aspects of the subject matter described here can be implemented as a system including data processing apparatus and computer-readable media storing computer program instructions executable by the data processing apparatus to perform the operations described here.

Yet another innovative aspect of the subject matter described here can be implemented as a system including a first computer-readable memory storing a redistribution set including multiple present users to whom selected content is presentable for a pre-defined duration, a second computer-readable memory storing the redistribution set and multiple past users who were included in the redistribution set and have previously been removed from the redistribution set based on an expiration of the pre-defined duration, data processing apparatus, and a computer-readable medium storing computer program instructions executable by the data processing apparatus to perform operations. A modification to the pre-defined duration is detected. In response to detecting the modification, the redistribution set of users stored in the first computer-readable memory is modified to include one or more past users stored in the second computer-readable memory or to exclude one or more present users stored in the first computer-readable memory resulting in a modified redistribution set of users. The modified redistribution set of users is stored in the first computer-readable memory in place of the redistribution set of users. The modified redistribution set of users is utilized to target content to the multiple present users in the modified redistribution set.

This, and other aspects, can include one or more of the following features. Modifying the redistribution set of users to exclude one or more present users can include storing the one or more excluded present users with the multiple past users on the second computer-readable memory. The first computer-readable memory can store the pre-defined duration time. For each user of the multiple present users included in the redistribution set, a corresponding user identifier and an inclusion time when a respective user was included in the redistribution set. The second computer-readable memory can store, for each user of the multiple past users who have previously been removed from the redistribution set, a corresponding user identifier and an inclusion time when a respective user was included in the redistribution set.

Particular implementations of the subject matter described in this specification can be implemented so as to realize none, one or more of the following advantages. For example, when content sponsors modify an expiration duration for which content can be presented to users in a redistribution set, the redistribution set can be modified to include past users who have previously been removed from the set. Consequently, content sponsors can present selected content to such past users as well as present users resulting in increased exposure of such content to users. Further, the redistribution set can also be modified to exclude present users if the content sponsors shorten the duration for which content can be presented to users. As a result, content sponsors can enjoy savings by not having to pay for users who may no longer be interested in or eligible to receive content. In addition, users can receive content that is of interest to the user for a duration for which the user is interested in such content.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes distributing content to users included in redistribution sets (or redistribution lists), each including multiple users. As described below, a redistribution set of users can be created by or in response to a request by a content sponsor. The redistribution set can include users to whom identified content can be presented as a consequence of the users having performed an action or actions specified by the content sponsor. For example, the content sponsor can be an advertiser hosting a website. The advertiser can specify that users who access the website are to be included in a redistribution set. In some implementations, when a user accesses the website, the user is included in the redistribution list. In this manner, a redistribution set including users who accessed the advertiser's website can be formed. The advertiser can target content provided by the advertiser to users in the redistribution set. Other ways of forming redistribution sets are possible. For example, users can be added to a redistribution list in a batch process (for example, once per day).

A redistribution set can be associated with a pre-defined duration for which content can be presented to users included in the redistribution set. For example, an advertiser can specify that advertisements are to be presented to a particular user for the pre-defined duration (for example, 15 days, 30 days, 45 days, 60 days, and the like) starting from the day that the particular user was included in the redistribution set. The pre-defined duration can represent, for example, a duration for which users included in the redistribution set are likely to be interested in the selected content. Upon expiration of the pre-defined duration, the particular user can be excluded from the redistribution set such that the selected content is no longer presentable to the excluded user. The selected content can continue to be presented to remaining users in the redistribution set and to new users who are included in the redistribution set.

In some situations, the pre-defined duration for which content can be presented to users included in the redistribution set can be modified. For example, an advertiser can extend a current pre-defined duration (for example, 30 days) to another period (for example, 45, 60, or 90 days). For a pre-defined duration of 30 days, a user who was included in the redistribution set 45 days before the modification would have previously been removed or excluded from the redistribution set. However, for the extended duration (i.e., 60 days in this example), the previously excluded user can be re-added to the redistribution set to receive selected content despite the previous removal or exclusion because the date that the user was added to the redistribution set is within the new pre-defined duration. Similarly, the expiration date for users currently included in the redistribution set can be updated so that the users are removed from the distribution set after expiration of the new pre-defined duration.

Conversely, if the advertiser shortens the current pre-defined duration from 30 days to, for example, 15 days, another user who was included in the redistribution set 20 days before the modification may no longer be eligible to receive selected content. The techniques described here can modify redistribution sets based on modifications to the pre-defined duration to either re-include or reinstate one or more previously excluded users or to exclude one or more present users or both depending on the modification to the pre-defined duration.

Figure 1:
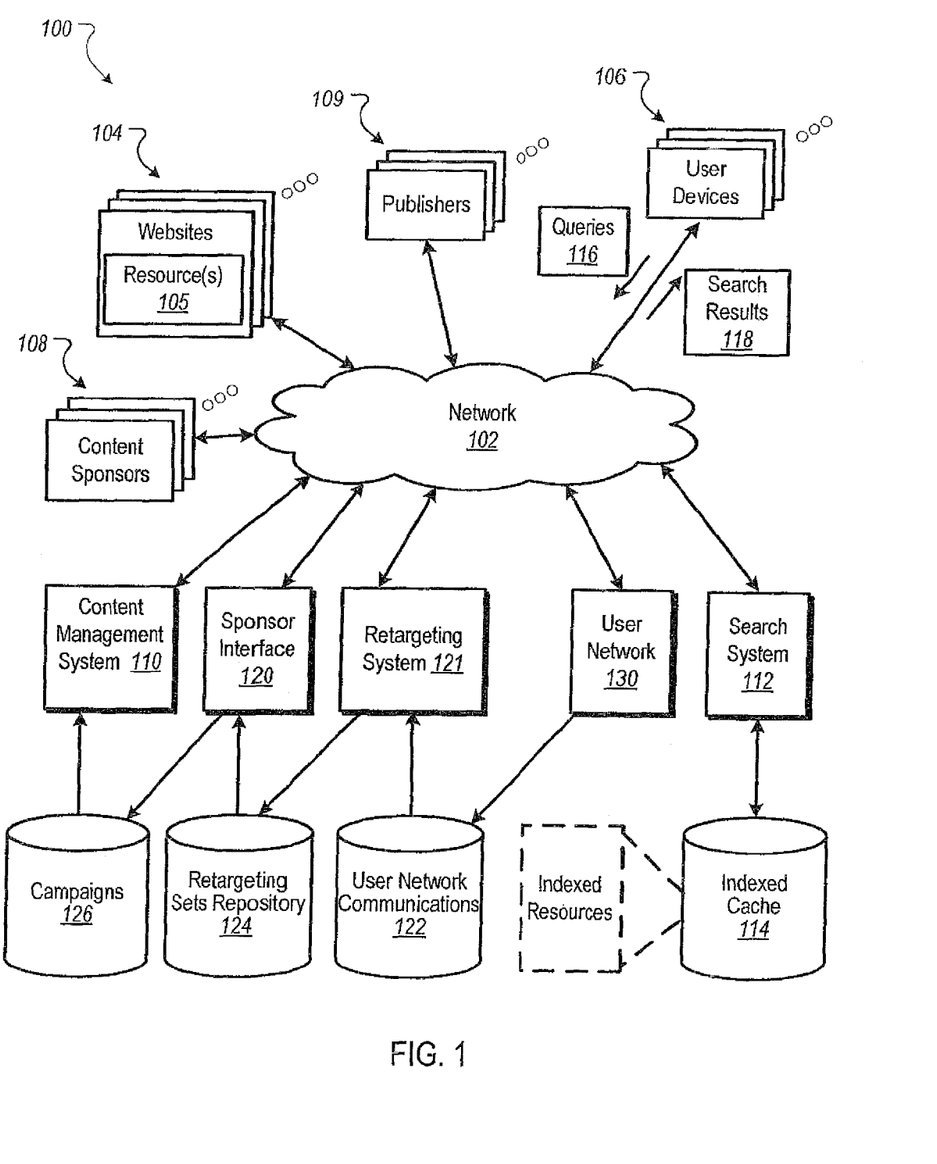
FIG. 1 is a block diagram of an example environment for distributing content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (for example, advertisers), content publishers 109, and the content management system 110. The example environment 100 may include many thousands of websites 104, user devices 106, content sponsors 108, and content publishers 109.

The example environment 100 further includes at least one network 130 (for example, the Internet), redistribution system 121 for maintaining redistribution sets of users to whom selected content (for example, one or more advertisements) is presentable for a pre-defined duration, and a sponsor interface 120 that the content sponsor 108 can use to create campaigns for content items, including campaigns to target content items to users in the redistribution sets repository 124. The redistribution system 121 can facilitate distributing advertisements (or other content items) to a set of users based, at least in part, on the users having previously performed a pre-specified action (i.e., a target interaction). In some implementations, the redistribution system 121 can enable an advertiser to create, or request creation of a redistribution set with which one or more redistributed advertisements (or other content items) can be targeted.

A redistribution set can include a set of user identifiers for users that have been determined (for example, based on interaction data) to have performed a target interaction, which, in some situations, the advertiser can specify. The redistribution set can additionally include, for each user in the redistribution set, an inclusion time representing a time at which the user was included in the redistribution set. The inclusion time can be specified at one or more levels of granularity, for example, a month, a week, a day, an hour, a minute, and the like. The redistribution set can also include a pre-defined expiration duration applicable to the redistribution set as a whole, and, for each user, an expiration time, which can be determined as a sum of an inclusion time of a respective user and the pre-defined expiration duration.

Figure 2A:
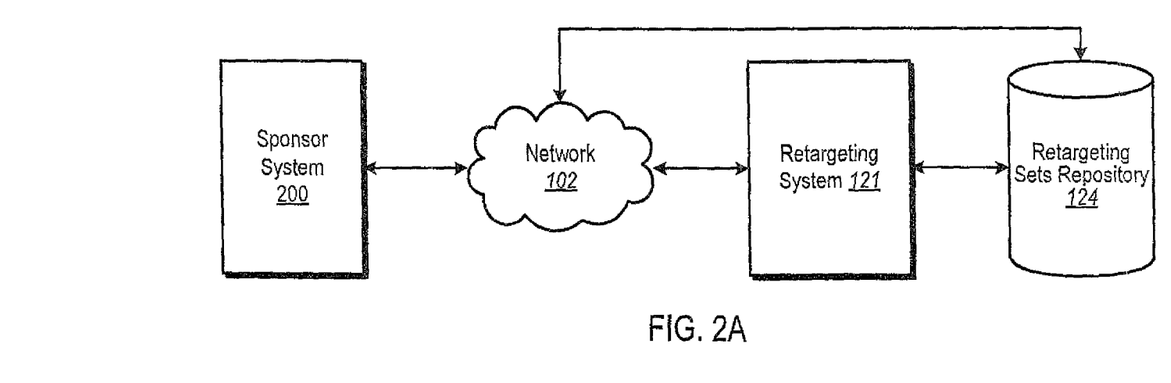
FIGS. 2A and 2B are example systems for maintaining redistribution sets.
Figure 2B:
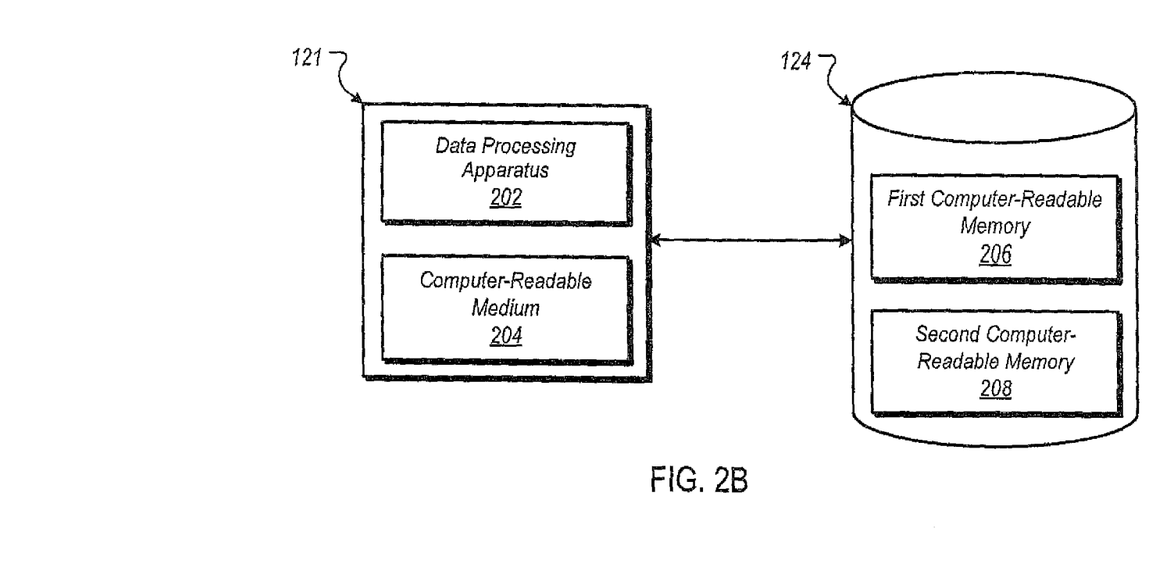

FIGS. 2A and 2B are example systems for maintaining redistribution sets. As shown in FIG. 2A, a sponsor system 200 (for example, a server system hosting a website including multiple inter-related webpages) associated with a content sponsor (for example, an advertiser) can be connected to the redistribution system 121 through the network 102. The redistribution system 121 can include a computer-readable medium 204 encoding computer program instructions executable by data processing apparatus 202 to perform the operations described here.

The sponsor system 200, which can include content presentable to users, can request the redistribution system 121 to create and maintain multiple redistribution sets of users to whom the content sponsor's content or other content can be targeted. For each redistribution set, the sponsor system 200 can specify a corresponding pre-defined duration for which selected content is presentable to users in a respective redistribution set. For example, the sponsor system 200 can specify the pre-defined duration for a particular redistribution set to be a certain number of days starting from a time (for example, a day, an hour, a minute, or the like) on which a particular user is included in the particular redistribution set. Similarly to the inclusion time, the pre-defined duration can be specified at different levels of granularity, for example, in months, weeks, days, hours, minutes, and the like.

To request that the redistribution system 121 create a redistribution set, the sponsor system 200 can specify a target action performable by a user and specify that users who perform the target action are to be included in the redistribution set. In some implementations, the target action can be the execution of a redistribution script, which can include computer program instructions executable by data processing apparatus. The redistribution system 121 can store such a redistribution script, for example, on a computer-readable medium 204. To create a redistribution set, the sponsor system 200 can receive the redistribution script from the redistribution system 121 (for example, through a user interface), and include the redistribution script in the content included in the sponsor system 200. For example, the sponsor system 200 can embed the redistribution script in one or more of the web pages of the website that the sponsor system 200 hosts. A user can access the content hosted by the sponsor system 200 using a client device (for example, a computer system). When the user does so, the user's client device can execute the redistribution script, thereby identifying the target action specified by the content sponsor.

The redistribution system 121 can track occurrences of the execution of the redistribution script, and the users who caused such execution. The redistribution system 121 can include such users in the redistribution set because the users performed the targeted action specified by the content sponsor. In some implementations, the redistribution system 121 can receive interaction data from client devices that execute the redistribution script encoded in the content that the client devices present. The interaction data can include data indicating that a user identifier (for example, a cookie or another user identifier, such as an account identifier), representing the user who caused the redistribution script to be executed, is to be added to the redistribution set.

The interaction data can additionally include a time at which the user performed the action (for example, a timestamp). Based on this time, the redistribution system 121 can determine an inclusion time for the user, which represents a time at which the user is included in the redistribution set. The inclusion time can be the time at which the user performed the action or the time at which the redistribution system 121 received the interaction data describing the user. Based on an inclusion time and the pre-defined duration, the redistribution system 121 can determine an expiration time for the user.

The redistribution system 121 can store the redistribution set including the user identifiers, the inclusion times, the expiration times, and the pre-defined duration, for example, in redistribution sets repository 124. The redistribution system 121 can perform these operations to create and store multiple redistribution sets that can each include multiple users.

At various times after the inclusion of users in a redistribution set, the redistribution system 121 can monitor expiration times associated with the users. At any time, if the redistribution system 121 determines that a particular user has been included in the redistribution list for longer than the pre-defined duration, then the redistribution system 121 can exclude the particular user from the redistribution set, for example, by deleting information associated with the particular user from the redistribution set. The monitoring times can be pre-defined times, for example, once every two days, every day, once every four hours, or the like. Alternatively, or in addition, the monitoring time can be a time when the redistribution system 121 detects an event, for example, a modification to a pre-defined duration.

In this manner, the redistribution system 121 can identify two types of users—present users with respect to whom the pre-defined duration has not expired and who are consequently included in the redistribution set, and past users with respect to whom the pre-defined duration has expired and who are consequently excluded from the redistribution set. As shown in FIG. 2B, the redistribution system 121 can store the present users of the redistribution set in a first computer-readable memory 206, for example, as a first list. Rather than permanently delete the past users, the redistribution system 121 can store the past users of the redistribution set in a second computer-readable memory 208, for example, in a second list.

The redistribution system 121 can be configured to modify a redistribution set to include past users (i.e., users who have previously been excluded from the redistribution set) based on a modification to the pre-defined duration. When a content sponsor extends the pre-defined duration associated with a redistribution set and consequently increases a duration for which selected content is presentable to users included in the redistribution set, selected content may be presentable to a past user based on the increase. For example, when an advertiser extends a current pre-defined duration (for example, 30 days) to a new duration (for example, 60 days), a past user who was included in the redistribution set 45 days before the time of extension, is now eligible to receive selected content.

Because the redistribution system 121 stores the past users of the redistribution set in the second computer-readable memory 208, the redistribution system 121 can identify the past user who is now eligible to receive the selected content, and re-include or reinstate the past user in the redistribution set. In this manner, the redistribution system 121 can generate a modified redistribution set of users, and use the modified redistribution set of users to target content to the present users in the modified redistribution set. Some implementations of modifying a redistribution set of users are described with reference to FIG. 3.

Figure 3:
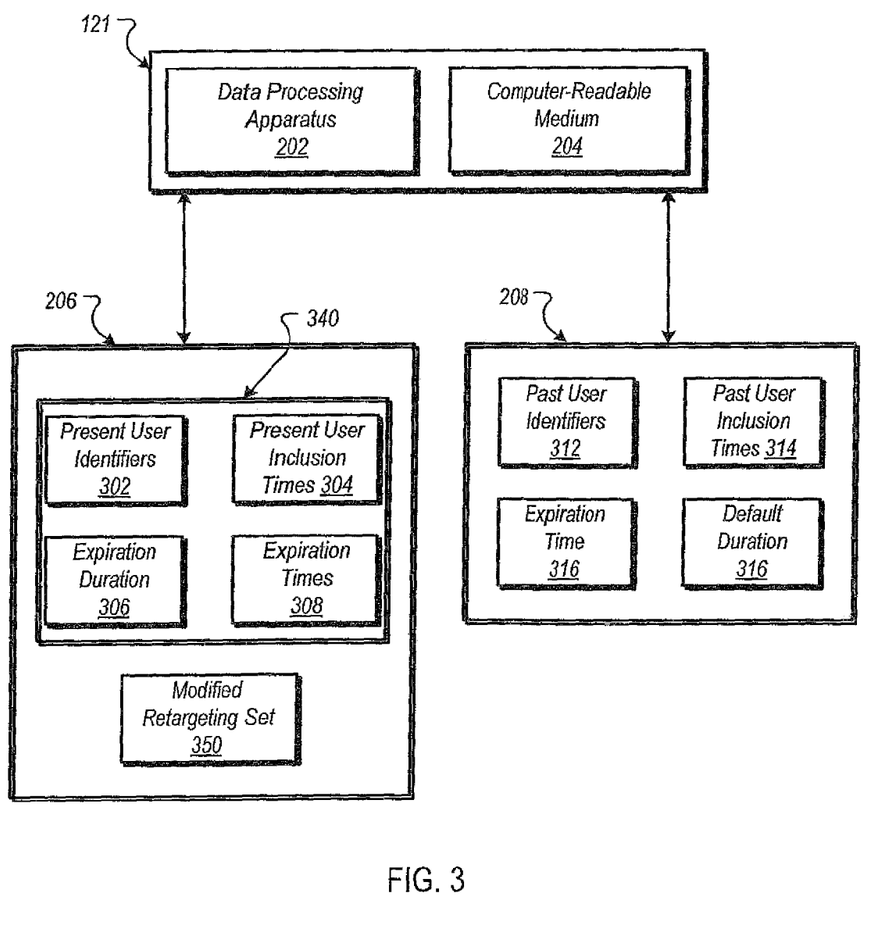
FIG. 3 is an example redistribution system for modifying a redistribution set.

FIG. 3 is an example redistribution system for modifying a redistribution set. The first computer-readable memory 206 can include (for example, store) a redistribution set 340 that includes multiple present users to whom selected content is presentable for a pre-defined duration. The first computer-readable memory 206 can store user information about the multiple present users. The information can include present user identifiers 302, each of which identifies a corresponding present user, and user inclusion times 304, each of which represents a time (for example, a day, an hour, a minute, and the like) at which a corresponding present user was included in the redistribution set 340. In some implementations, the user inclusion times 304 can include dates and times of the day when the user was included in the redistribution list. Optionally, the user information can also include expiration times 308, each of which represents a time (for example, a date or a number of days or both) when a duration for which content is presentable to a corresponding present user expires. In some implementations, the redistribution system 121 can determine an expiration time for each present user as a sum of a respective present user's inclusion time and the expiration duration 306. The redistribution system 121 can cause expiration times 308 so determined to be stored in the first computer-readable memory 206.

As described previously, at various times, the redistribution system 121 can monitor the expiration times of present users included in the redistribution set 340, and identify one or more present users to whom selected content can no longer be presented. In some implementations, each time at which the redistribution system 121 monitors the expiration times of present users can be a present time. For example, the redistribution system 121 can associate a frequency of monitoring with the present time. The frequency at which the redistribution system 121 monitors the expiration times can vary and can be, for example, once in four hours, once a day, or once every two days, or the like.

Based on the monitoring, the redistribution system 121 can identify one or more present users whose respective expiration times fall before a monitoring time, exclude the one or more users by deleting the user information associated with the identified one or more users, and include the one or more users in the second computer-readable memory 208 as past users. For example, similarly to the present user information, the past user information can include past user identifiers 312, past user inclusion times 314 (for example, dates and times), and optionally past user expiration times 316 (for example, respective dates or number of days). Thus, the redistribution set 340 is a set that includes multiple present users to whom selected content is presentable. The multiple present users are stored in the first computer-readable memory 206. Multiple past users who were previously included in the redistribution set 340 and that have been removed from the redistribution set 340 based on an expiration of the expiration duration 306 can be stored in the second computer-readable memory 208.

In some implementations, the memory 208 can include a default duration 316 which can be longer than the pre-defined duration associated with the redistribution set. For example, the default duration 316 can be the longest possible, for example, legally permissible, duration (such as 540 days) for which a user may be included in a list for the purpose of providing selected content. Alternatively, the second computer-readable memory 208 need not include any duration associated with the past users.

In some implementations, the redistribution system 121 can detect a modification to the pre-defined duration. For example, a content sponsor can transmit an instruction to the redistribution engine 121 to modify the pre-defined duration (for example, 30 days) associated with the redistribution set 340 to a modified duration (for example, 45 days), which is greater than the pre-defined duration. In such implementations, the time at which the redistribution system 121 receives notice of the modification is considered a present time. Alternatively, the redistribution system 121 can detect the modification during a periodic monitoring operation, which was described above. In such implementation, the present time can be the time at which the redistribution system 121 monitors the redistribution set 340.

In response to detecting the modification, the redistribution system 121 can determine if one or more past users stored in the second computer-readable memory 208 need to be re-included in the redistribution set 340 stored in the first computer-readable memory 206. To do so, the redistribution system 121 can determine, for each past user in the second computer-readable memory 208, a sum of an inclusion time ($T_i$) of a respective past user and the modified duration ($D_m$). For example, the inclusion time of a first user ($T_{1i}$) is January 1, the inclusion time of a second user ($T_{2i}$) is January 7, and the inclusion time of a third user ($T_{3i}$) is January 12. The pre-defined expiration duration 304 is 30 days; consequently, the first user would have become a past user after January 30, the second user would have become a past user after February 5, and the third would have become a past user after February 10.

On February 14 (i.e., 45 days after the first user was included in the redistribution list), the redistribution system 121 determined that the modified duration was increased by 5 days to 35 days either in response to receiving an instruction from the sponsor system 200 or during a periodic monitoring operation. Consequently, February 14 represents the present time. The redistribution system 121 can then determine that, for the first user, the sum of the inclusion time ($T_{1i}$) and the modified duration ($D_m$) is February 5 (i.e., January 1+35 days), for the second user, the sum of the inclusion time ($T_{2i}$) and the modified duration ($D_m$) is February 10 (i.e., January 7+35 days), and for the third user, the sum of the inclusion time ($T_{3i}$) and the modified duration ($D_m$) is February 15 (i.e., January 12+35 days).

By comparing the present time (i.e., February 14) with each sum, the redistribution system 121 can determine that the third user is now eligible to receive selected content because the modified expiration duration for the third user (i.e., February 15) falls after the present time (i.e., February 14). Consequently, the redistribution system 121 transfers the third user (for example, the user identifier, user inclusion time, and any associated information) from the second computer-readable memory 208 to the redistribution set 340 in the first computer-readable memory 206.

Similarly, the redistribution system 121 can determine that the first and second users remain ineligible to receive selected content despite the modified duration because the respective sums for both users (i.e., February 5 for the 1$^{st}$ user and February 10 for the second user) remain less than the present time (i.e., February 14). Consequently, the redistribution system 121 retains the first and second users in the second computer-readable memory 208. In this manner, the third user is re-included in the redistribution set 340, but the first and second users are not. The foregoing example is shown in Table 1.

TABLE 1

Re-including certain past users in the redistribution set

| User No. | $T_i$ | $D_l = T_i + D_m$ | $T_p$ | $D_1 < D_2$ |
|---|---|---|---|---|
| 1 | Jan 1 | Feb 5 | Feb 14 | No |
| 2 | Jan 7 | Feb 10 | Feb 14 | No |
| 3 | Jan 12 | Feb 15 | Feb 14 | Yes |

In the example described above, the modified duration (i.e., 35 days) was an extension of the expiration duration 306 (i.e., 30 days). Consequently, the redistribution system 121 did not need to determine if any present users need to be excluded from the redistribution set 340. However, in some implementations, the modified duration can be a shortening of the expiration duration 306. For example, the modified duration can be 15 days whereas the expiration duration 306 is 30 days. In response to such a modification, the redistribution system 121 can determine if one or more present users stored in the second computer-readable memory 208 need to be excluded from the redistribution set 340 stored in the first computer-readable memory 206.

For example, on January 20 (i.e., 20 days after the first user was included in the redistribution list), the redistribution system 121 determined that the modified duration was decreased by 15 days to 15 days either in response to receiving an instruction from the sponsor system 200 or during a periodic monitoring operation. In this example, January 20 represents the present time. The redistribution system 121 can determine that, for the first user, the sum of the inclusion time ($T_{1i}$) and the modified duration ($D_m$) is January 15 (i.e., January 1+15 days), for the second user, the sum of the inclusion time ($T_{2i}$) and the modified duration ($D_m$) is January 21 (i.e., January 7+15 days), and for the third user, the sum of the inclusion time ($T_{3i}$) and the modified duration ($D_m$) is January 25 (i.e., January 11+15 days).

By comparing the present time (i.e., January 20) with each sum, the redistribution system 121 can determine that the first user is no longer eligible to receive selected content because the modified expiration duration for the first user (i.e., January 15) falls before the present time (i.e., January 20). The redistribution system 121 similarly can determine that the modified expiration times for the second user (i.e., January 21) and the third user (i.e., January 26) each fall after the present time. Consequently, the redistribution system 121 determines that the first and second users remain present users, but the third user is a past user. The redistribution system 121 deletes the user information associated with the third user from the redistribution set 340 in the first computer-readable memory, and includes the same or a modified set of information in the second computer-readable memory 208. This example is shown in Table 2.

TABLE 1

Excluding certain present users from the redistribution set

| User No. | $T_i$ | $D_l = T_i + D_m$ | $T_p$ | $D_1 > D_2$ |
|---|---|---|---|---|
| 1 | Jan 1 | Jan 15 | Jan 20 | No |
| 2 | Jan 7 | Jan 21 | Jan 20 | Yes |
| 3 | Jan 11 | Jan 25 | Jan 20 | Yes |

In some situations, the redistribution system 121 can determine that a past user who was previously included in the redistribution set at a first inclusion time can be re-included in the redistribution set 340 based on an extension to the expiration duration 306 has already been included in the redistribution set 340 at a second inclusion time that is more recent than the first inclusion time. For example, the user may have performed the target action specified by the content sponsor twice—once at or near the first inclusion time, and again at or near the second inclusion time. The user may have been excluded from the redistribution set 340 upon expiration of the expiration duration 306 determined relative to the first inclusion time. Subsequently, the user may have performed the target action again causing the user to be added to the redistribution set 340 at the second inclusion time. In such situations, the redistribution system 121 can retain the user information associated with the more recent inclusion time, and exclude older user information. Thus, in this example, the redistribution system 121 need not re-include the user in the redistribution set 340.

Figure 4:
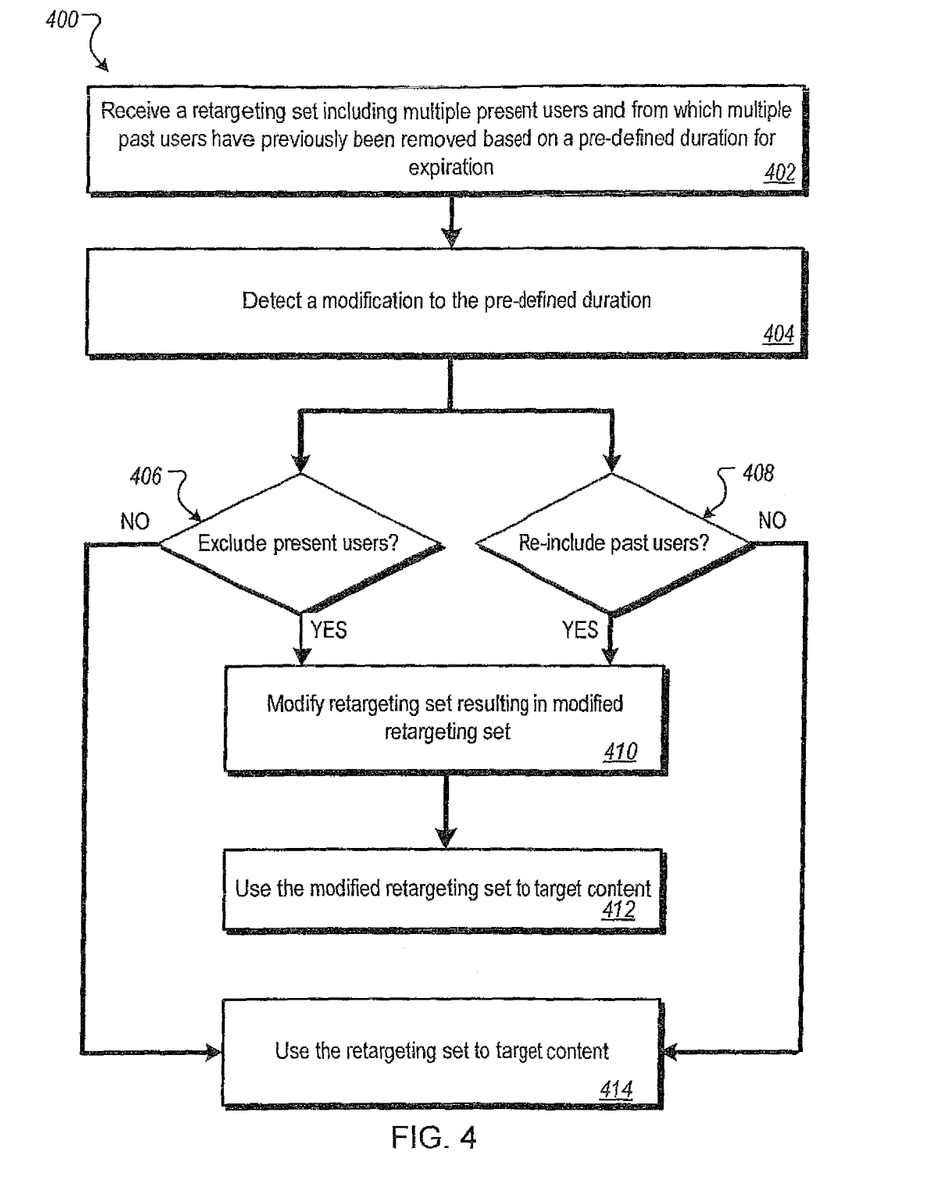
FIG. 4 is a flowchart of an example process for modifying a redistribution set.

FIG. 4 is a flowchart of an example process 400 for modifying a redistribution set. The process 400 can be implemented as one or more computer programs which are stored on computer-readable media and are executable by data processing apparatus to perform the operations of the process 400. For example, the process 400 can be performed by the redistribution system 121. A redistribution set is received including multiple present users and from which multiple past users may have previously been removed based on a pre-defined duration for expiration (402). A modification to the pre-defined duration is detected (404). A check is made to determine if the modification causes present users to be excluded (406) or causes past users to be included (408). When it is determined that present users are to be excluded (decision branch "YES" from 406) or that past users are to be re-included (decision branch "YES" from 408), then the redistribution set is modified resulting in a modified redistribution set (410). The modified redistribution set is used to target content (412). For example, the redistribution system 121 provides the modified redistribution set to the sponsor system 200 so that the content sponsor can target content to users in the modified redistribution set. On the other hand, if the process determines that present users need not be excluded (decision branch "NO" in 406) or that past users need not be re-included (decision branch "NO" in 408), then the unmodified redistribution set is used to target content (414).

Figure 5:
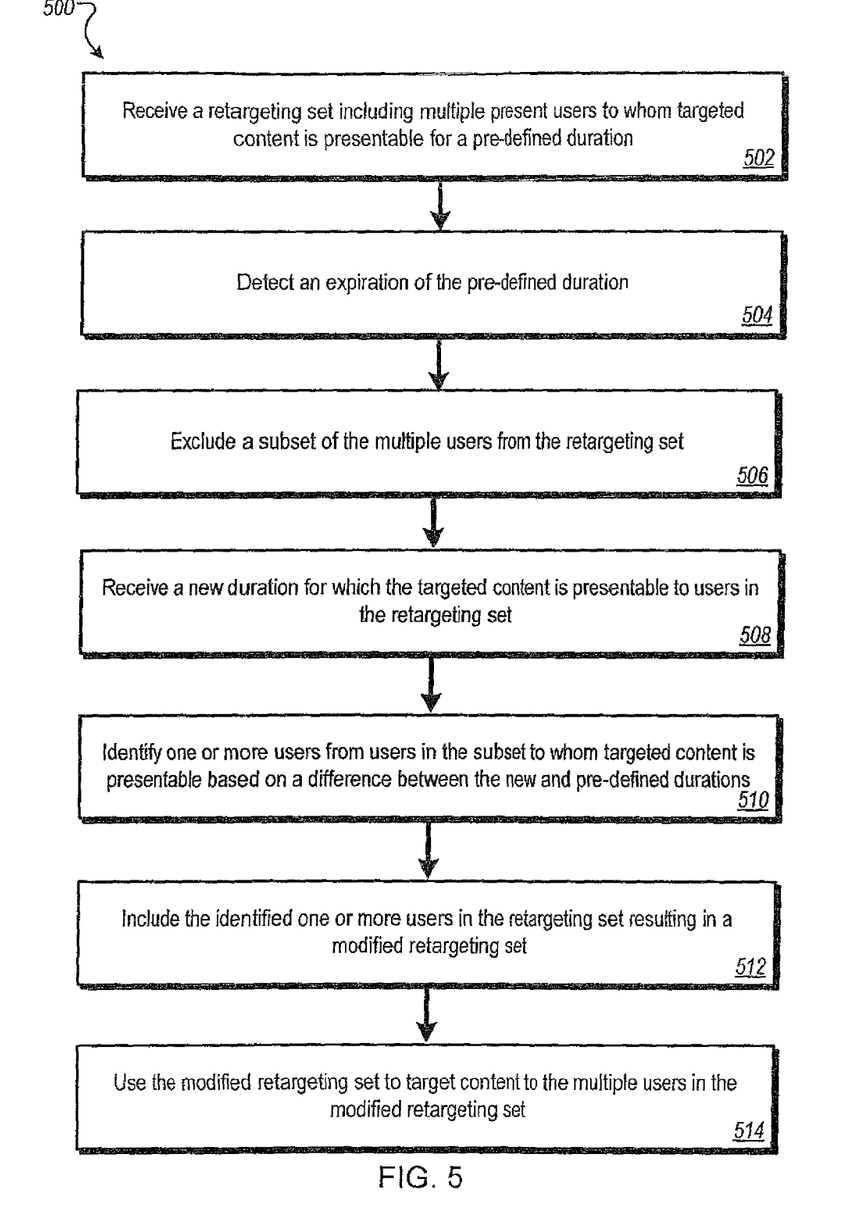
FIG. 5 is a flowchart of another example process for modifying a redistribution set.

FIG. 5 is a flowchart of another example process 500 for modifying a redistribution set. The process 500 can be implemented as one or more computer programs which are stored on computer-readable media and are executable by data processing apparatus to perform the operations of the process 500. For example, the process 500 can be performed by the redistribution system 121. A redistribution set including multiple present users to whom selected content is presentable for a pre-defined duration is received (502). An expiration of the pre-defined duration is detected (504). A subset of the multiple users from the redistribution set is excluded based at least in part on the expiration (506). A new duration for which the selected content is presentable to users in the redistribution set is received (508). The new duration is greater than the pre-defined duration. One or more users from users in the subset to whom the selected content is presentable are identified based on a difference between the new duration and the pre-defined duration (510). The identified one or more users are included in the redistribution set resulting in a modified redistribution set (512). The modified redistribution set is used to target content to the multiple users of the modified redistribution set (514).

Returning to FIG. 1, a website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104. The processes 400,500 can be implemented as one or more computer programs which are stored on computer-readable media and are executable by data processing apparatus to perform the operations of the processes 400,500. For example, the processes 400,500 can be performed by the redistribution system 121.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript scripts).

A user device 106 is an electronic device that is under control of a user and is capable of requesting and receiving resources over the network 102. Example user devices 106 include personal computers, mobile communication devices (for example, smartphones), and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. These specified portions of the resource or user display are referred to as slots (for example, ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 accesses the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies a resource that is responsive to a particular search query, and includes a link to the resource. In some implementations, the content management system 110 can generate search results 118 using information (for example, identified resources) received from the search system 112. An example search result 118 can include a web page title, a snippet of text or a portion of an image extracted from the web page, and the URL of the web page. Search results pages can also include one or more slots in which other content items (for example, ads) can be presented. In some implementations, slots on search results pages or other web pages can include content slots for content items that have been provided as part of a reservation process. In a reservation process, a publisher and a content item sponsor enter into an agreement where the publisher agrees to publish a given content item (or campaign) in accordance with a schedule (for example, provide 1000 impressions by date X) or other publication criteria. In some implementations, content items that are selected to fill the requests for content slots can be selected based, at least in part, on priorities associated with a reservation process (for example, based on urgency to fulfill a reservation) and information related to re-publication groups.

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (for example, URL) to the resource for which the slot is defined, a size of the slot, and/or media types that are available for presentation in the slot can be provided to the content management system 110. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116 or ads associated with campaigns that have targeted the user (such as the user in a re-publication group).

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (for example, based on the highest bidders at the conclusion of the auction or based on other criteria, such as those related to satisfying open reservations). The offers represent the amounts that the content sponsors are willing to pay for presentation (or selection) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (for example, an ad), is referred to a web page, and consummates a purchase there before leaving that web page. A conversion can also be defined by a content provider to be any measurable/observable user action, such as downloading a white paper, navigating to at least a given depth of a website, viewing at least a certain number of web pages, spending at least a predetermined amount of time on a web site or web page, registering on a website, experiencing media, or performing a social action regarding a content item (for example, an ad), such as republishing or sharing the content item. Other actions that constitute a conversion can also be used.

In some implementations, the likelihood that a conversion will occur can be improved, such as by serving content that is more likely to be of interest to the user. For example, content items (for example, ads) that are served can be selected in part based on re-publication groups to which the user belongs, which can also be an indication of how likely the user is to react positively to a content item, for example, leading to a conversion. The re-publication groups to which a user belongs can also be an indication of a likelihood that the user will discuss or share the content with other users within the re-publication groups.

For situations in which the systems discussed here collect personal information about users, the users may be provided with an opportunity to opt in/out of programs or features that may collect personal information (for example, information about a user's social network, social actions or activities, a user's preferences, or a user's current location). In addition, certain data may be anonymized in one or more ways before it is stored or used, so that personally identifiable information is removed. For example, a user's identity may be anonymized so that the no personally identifiable information can be determined for the user, or a user's geographic location may be generalized where location information is obtained (such as to a city, ZIP code, or state level), so that a particular location of a user cannot be determined. In some implementations, opt out features related to social networking systems, for example, can allow the user to specify that the user's activity stream content is not to be used in ads, or to anonymize the information in some way. Further, in situations in which information is gathered and stored related to the subject matter of communications among users, the information can be aggregated (for example, to a keyword level), personal information can be omitted (for example, not stored), and the information can be associated with users using anonymized user identifiers.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   receiving a redistribution set including a plurality of present users and excluding a plurality of past users who were previously included in the redistribution set, wherein each user of the plurality of present users and the plurality of past users is associated with a corresponding inclusion time specifying when the respective user was included in the redistribution set, wherein the redistribution set is associated with a pre-defined duration for which selected content is to be presented to each user of the plurality of present users for the pre-defined duration starting from the corresponding inclusion time associated with the respective user, and wherein each user of the plurality of past users was previously removed from the redistribution set after expiration of the pre-defined duration starting from the corresponding inclusion time associated with the respective user, and wherein the selected content includes one or more advertisements;
   detecting a modification to the pre-defined duration, wherein the modification to the pre-defined duration results in a modified duration including one of an extended duration or a shortened duration;
   in response to detecting the modification, determining, for each user of the plurality of present users and the plurality of past users, whether the modified duration starting from the corresponding inclusion time associated with the respective user has expired;
   modifying the redistribution set of users to include one or more past users of the plurality of past users or to exclude one or more present users of the plurality of present users based on the determining, resulting in a modified redistribution set of users; and
   using the modified redistribution set of users to target content to the plurality of present users in the modified redistribution set.

2. The method of claim 1, wherein modifying the redistribution set of users occurs at a present time, and wherein the method further comprises, for each user of the plurality of present users and the plurality of past users, determining a sum of the inclusion time and the modified duration.

3. The method of claim 2, wherein modifying the redistribution set of users to include the one or more past users comprises, for each of the plurality of past users, identifying a user for whom the sum is greater than the present time as one of the one or more past users to be included in the redistribution set.

4. The method of claim 2, wherein modifying the redistribution set of users to exclude the one or more present users comprises, for each of the plurality of present users, identifying a user for whom the sum is less than the present time as one of the one or more present users to be excluded from the redistribution set.

5. The method of claim 2, wherein the present time is a time of detecting the modification to the pre-defined duration.

6. The method of claim 2, wherein the present time is a previously defined time to determine whether the pre-defined duration has been modified.

7. The method of claim 1, wherein the modification is an extension to the pre-defined duration resulting in the extended duration, and wherein modifying the redistribution set of users comprises determining that the one or more past users are includable in the redistribution set based on the extended duration.

8. The method of claim 1, wherein the modification is a shortening of the pre-defined duration resulting in the shortened duration, and wherein modifying the redistribution set of users comprises determining that the one or more present users are excludable in the redistribution set based on the shortened duration.

9. The method of claim 1, wherein detecting a modification to the pre-defined duration comprises receiving an instruction to modify the pre-defined duration from a provider of the selected content.

10. The method of claim 1, further comprising:
    storing the plurality of present users in a first list; and
    storing the plurality of present users and the plurality of past users in a second list.

11. The method of claim 10, wherein modifying the redistribution set of users to include one or more past users comprises:
    identifying the one or more past users from the second list; and
    including the identified one or more past users in the first list as new present users.

12. The method of claim 10, wherein modifying the redistribution set of users to exclude one or more present users comprises:
    removing the excluded one or more present users from the first list; and
    including the excluded one or more present users in the second list as new past users.

13. The method of claim 1, further comprising periodically detecting for the modification to the pre-defined duration.

14. A computer-implemented method comprising:
    receiving a redistribution set including a plurality of users, wherein each user of the plurality of users is associated with a corresponding inclusion time specifying when the respective user was included in the redistribution set, and wherein the redistribution set is associated with a pre-defined duration for which selected content is to be presented to each user of the plurality of users for the pre-defined duration starting from the corresponding inclusion time associated with the respective user, and wherein the selected content includes one or more advertisements;
    for each user of the plurality of users, determining whether the pre-defined duration starting from the corresponding inclusion time associated with the respective user has expired;
    excluding a subset of the plurality of users from the redistribution set based on determining that the pre-defined duration starting from the inclusion times associated with the subset of the plurality of users has expired;
    receiving a new duration for which the selected content is presentable to users in the redistribution set, wherein the new duration is greater than the pre-defined duration;
    determining, for each user of the subset of the plurality of users excluded from the redistribution list, whether the new duration starting from the corresponding inclusion time associated with the respective user of the subset has expired;

identifying one or more users from users in the subset to whom the selected content is presentable based on the determining;

including the identified one or more users in the redistribution set resulting in a modified redistribution set; and using the modified redistribution set to target content to the plurality of users in the modified redistribution set.

15. The method of claim 14, wherein pre-defined duration and the new duration are specified by a provider of the selected content.

16. The method of claim 14, wherein excluding the subset of the plurality of users from the redistribution set comprises, for each user in the subset, determining that a sum of the inclusion time and the pre-defined duration is greater than a present time.

17. The method of claim 14, wherein including the identified one or more users in the redistribution set comprises, for each of the one or more users who are included, determining that a sum of the inclusion time and the new duration is less than a present time.

18. The method of claim 17, wherein the present time is a previously defined time to determine whether the pre-defined duration has been modified.

19. A system comprising:

a first computer-readable memory storing a redistribution set including a plurality of present users, wherein each user of the plurality of present users is associated with a corresponding inclusion time specifying when the respective user was included in the redistribution set, and wherein the redistribution set is associated with a pre-defined duration for which selected content is to be presented to each user of the plurality of present users for the pre-defined duration starting from the corresponding inclusion time associated with the respective user, and wherein the selected content includes one or more advertisements;

a second computer-readable memory storing the redistribution set and a plurality of past users who were included in the redistribution set and have previously been removed from the redistribution set, wherein each user of the plurality of past users is associated with a corresponding inclusion time specifying when the respective user was included in the redistribution set, and wherein each user of the plurality of past users was previously removed from the redistribution set after expiration of the pre-defined duration starting from the corresponding inclusion time associated with the respective user;

data processing apparatus; and a computer-readable medium storing computer program instructions executable by the data processing apparatus to perform operations comprising:

detecting a modification to the pre-defined duration, wherein the modification to the pre-defined duration results in a modified duration including one of an extended duration or a shortened duration;

in response to detecting the modification, determining, for each user of the plurality of present users and the plurality of past users, whether the modified duration starting from the corresponding inclusion time associated with the respective user has expired;

modifying the redistribution set of users stored in the first computer-readable memory to include one or more past users of the plurality of past users stored in the second computer-readable memory or to exclude one or more present users of the plurality of present users stored in the first computer-readable memory based on the determining, resulting in a modified redistribution set of users;

storing the modified redistribution set of users in the first computer-readable memory in place of the redistribution set of users; and utilizing the modified redistribution set of users to target content to the plurality of present users in the modified redistribution set.

20. The system of claim 19, wherein modifying the redistribution set of users to exclude one or more present users comprises storing the one or more excluded present users with the plurality of past users on the second computer-readable memory.

21. The system of claim 19, wherein the first computer-readable memory stores the pre-defined duration time, and, for each user of the plurality of present users included in the redistribution set, a corresponding user identifier and the inclusion time when a respective user was included in the redistribution set.

22. The system of claim 19, wherein the second computer-readable memory stores, for each user of the plurality of past users who have previously been removed from the redistribution set, a corresponding user identifier and the inclusion time when a respective user was included in the redistribution set.

* * * * *